(12) United States Patent
Hsieh et al.

(10) Patent No.: US 11,907,428 B1
(45) Date of Patent: Feb. 20, 2024

(54) TOUCH DEVICE WITH PRESSURE SENSING AND VIBRATION FEEDBACK

(71) Applicant: Primax Electronics Ltd., Taipei (TW)

(72) Inventors: Chieh-Hung Hsieh, Taipei (TW); Wei-Chiang Huang, Taipei (TW); Chao-Wei Lee, Taipei (TW); Hsueh-Chao Chang, Taipei (TW); Sian-Yi Chiu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/944,925

(22) Filed: Sep. 14, 2022

(30) Foreign Application Priority Data

Aug. 26, 2022 (TW) ................................. 111132337

(51) Int. Cl.
*G06F 3/01* (2006.01)
*G06F 3/041* (2006.01)

(52) U.S. Cl.
CPC .......... *G06F 3/016* (2013.01); *G06F 3/04142* (2019.05)

(58) Field of Classification Search
CPC ................. G06F 3/016; G06F 3/04142–04146
See application file for complete search history.

(56) References Cited

U.S. PATENT DOCUMENTS

2011/0248839 A1* 10/2011 Kwok ..................... G06F 3/016
 345/173
2011/0248930 A1* 10/2011 Kwok ................... G06F 3/0488
 345/173

FOREIGN PATENT DOCUMENTS

CA 2734059 A1 * 10/2011 ............. G06F 3/016

* cited by examiner

*Primary Examiner* — Temesghen Ghebretinsae
*Assistant Examiner* — Ivelisse Martinez Quiles
(74) *Attorney, Agent, or Firm* — KIRTON McCONKIE; Evan R. Witt

(57) ABSTRACT

A touch device includes a touch panel, a circuit board, a vibrating unit and a pressure detection module. The touch panel includes two press regions. When different press regions of the touch panel are pressed by the user, the vibration feedback values generated by different press regions are different.

13 Claims, 4 Drawing Sheets

TOUCH DEVICE WITH PRESSURE SENSING AND VIBRATION FEEDBACK

FIELD OF THE INVENTION

The present invention relates to an input device, and more particularly to an input device for an electronic device.

BACKGROUND OF THE INVENTION

A touch device is an input module of an electronic device. When the touch device is pressed or slid by a user's finger, the operations of the electronic device can be correspondingly controlled. Since the touch device is very thin and light, the touch device is widely used in a notebook computer, a mobile phone, a PDA or any other appropriate electronic product. As the trends of designing the modern electronic products are toward light weightiness and slimness, the applications of touch devices on the electronic products become more popular.

According to the operating principles of the touch device, a touch panel is disposed within the touch device to sense the touched position, the touched number or the sliding trajectory of the user's hand and generate corresponding sensing values and control signals. Moreover, the touch device is usually equipped with a vibrator. When the touch device is pressed by the user, the vibrator is subjected to vibration. Consequently, the touch panel of the touch device generates the corresponding vibration feedback.

However, the conventional touch device still has some drawbacks. For example, when the magnitudes of the forces pressed on different regions of the touch panel are different, vibration feedbacks generated by the touch panel are identical. Due to this monotonous design, the user cannot achieve a good pressing experience.

For solving the above drawbacks, it is important to provide a touch device for generating different vibration feedbacks when different press regions are pressed.

SUMMARY OF THE INVENTION

The present invention provides a touch device. When different press regions of a touch panel of the touch module are pressed by the user, the touch panel can generate different vibration feedbacks.

In accordance with an aspect of the present invention, a touch device is provided. The touch device includes a touch panel and a circuit board. The touch panel includes at least two press regions. The circuit board is located under the touch panel and electrically connected with the touch panel. The circuit board includes a storage unit, a vibrator and a pressure detector. The storage unit includes a firmware. The firmware contains at least two range coordinate values, at least two press trigger threshold values and at least two driving voltage values corresponding to the at least two press regions. The vibrator vibrates the touch panel. The pressure detector detects a magnitude of an external force pressed on the touch panel. When the external force is applied to a selected press region of the at least two press regions, the magnitude of the external force is detected by the pressure detector. If a coordinate value of the selected press region is within the range coordinate value corresponding to the selected press region and the magnitude of the external force reaches the press trigger threshold value corresponding to the selected press region, the firmware is executed to drive the vibrator to result in vibration according to the corresponding driving voltage value. Consequently, the selected press region has a corresponding feedback vibration value.

In an embodiment, the firmware contains a first range coordinate value, a first press trigger threshold value and a first driving voltage value corresponding to a first press region of the at least two press regions and a second range coordinate value, a second press trigger threshold value and a second driving voltage value corresponding to a second press region of the at least two press regions.

In an embodiment, the first press trigger threshold value and the second press trigger threshold value are not equal.

In an embodiment, the first driving voltage value and the second driving voltage value are not equal.

In an embodiment, the pressure detector includes four pressure detection units.

In an embodiment, every two of the four pressure detection units are opposed to each other.

In an embodiment, the four pressure detection units are respectively aligned with four corners of the touch panel, or the four pressure detection units are aligned with two opposite sides of the touch panel.

In an embodiment, the touch device further includes a fixing frame, and the fixing frame includes a concave structure. The touch panel is accommodated within the concave structure. The circuit board is located under the fixing frame. The circuit board and the touch panel are opposed to each other with respect to the fixing frame.

In an embodiment, the fixing frame further includes a hollow part. The hollow part is formed in a bottom surface of the concave structure. The hollow part is aligned with the circuit board.

In an embodiment, the hollow part includes at least one first opening corresponding to the pressure detector. The pressure detector is exposed through the at least one first opening and contacted with a bottom surface of the touch panel.

In an embodiment, the hollow part includes a second opening corresponding to the vibrator. The vibrator is exposed through the second opening and contacted with a bottom surface of the touch panel.

In an embodiment, the hollow part includes a third opening. The circuit board is electrically connected with the touch panel through the third opening.

In an embodiment, the storage unit is a flash memory, an electrically-erasable programmable read-only memory (EEPROM) or a programmable read-only memory (PROM).

From the above descriptions, the present invention provides the touch device. The touch device comprises at least two press regions. When the magnitudes of the forces pressed on different regions of the touch panel are different, the vibration feedback values generated by the press regions are different. Due to this design, the user can achieve a good pressing experience.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
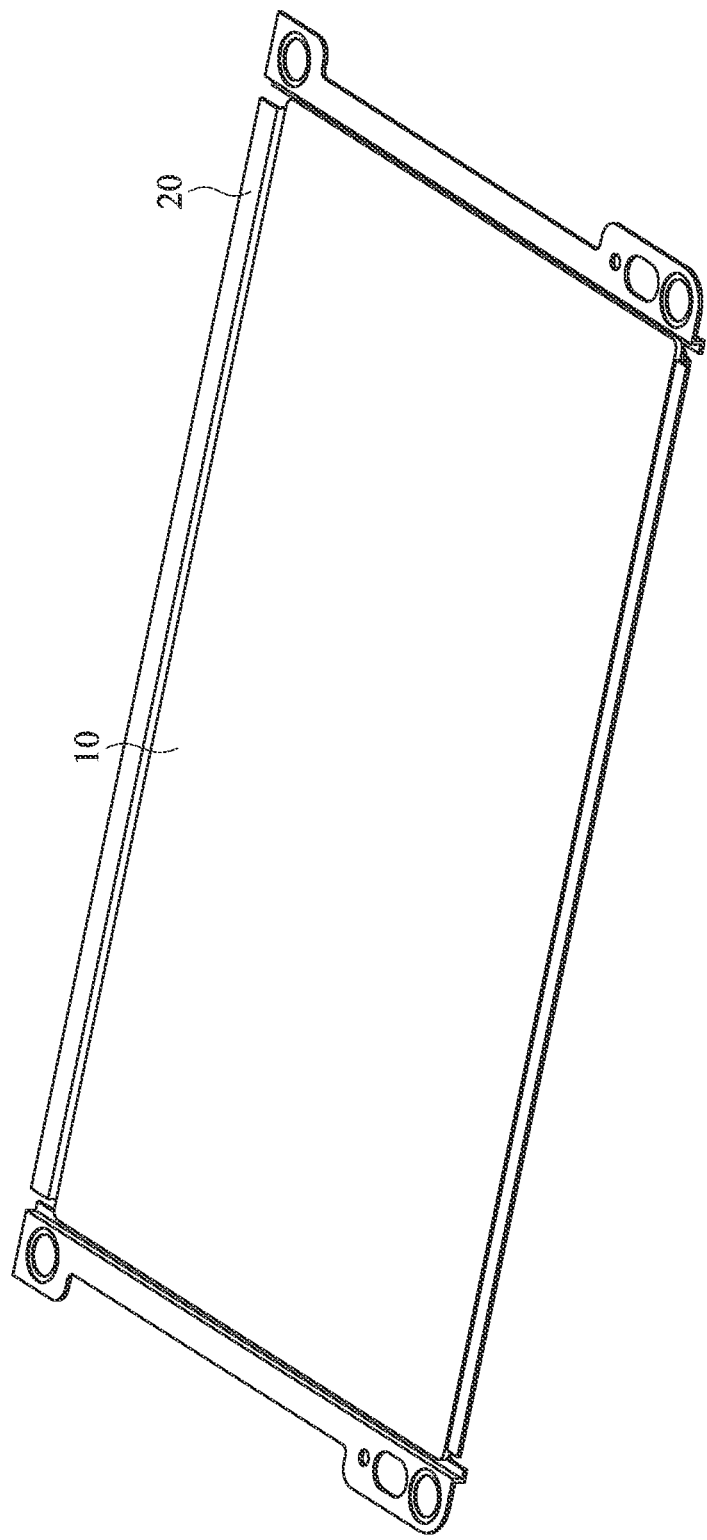
FIG. 1A is a schematic perspective view illustrating a touch device according to an embodiment of the present invention and taken along a viewpoint.
Figure 1B:
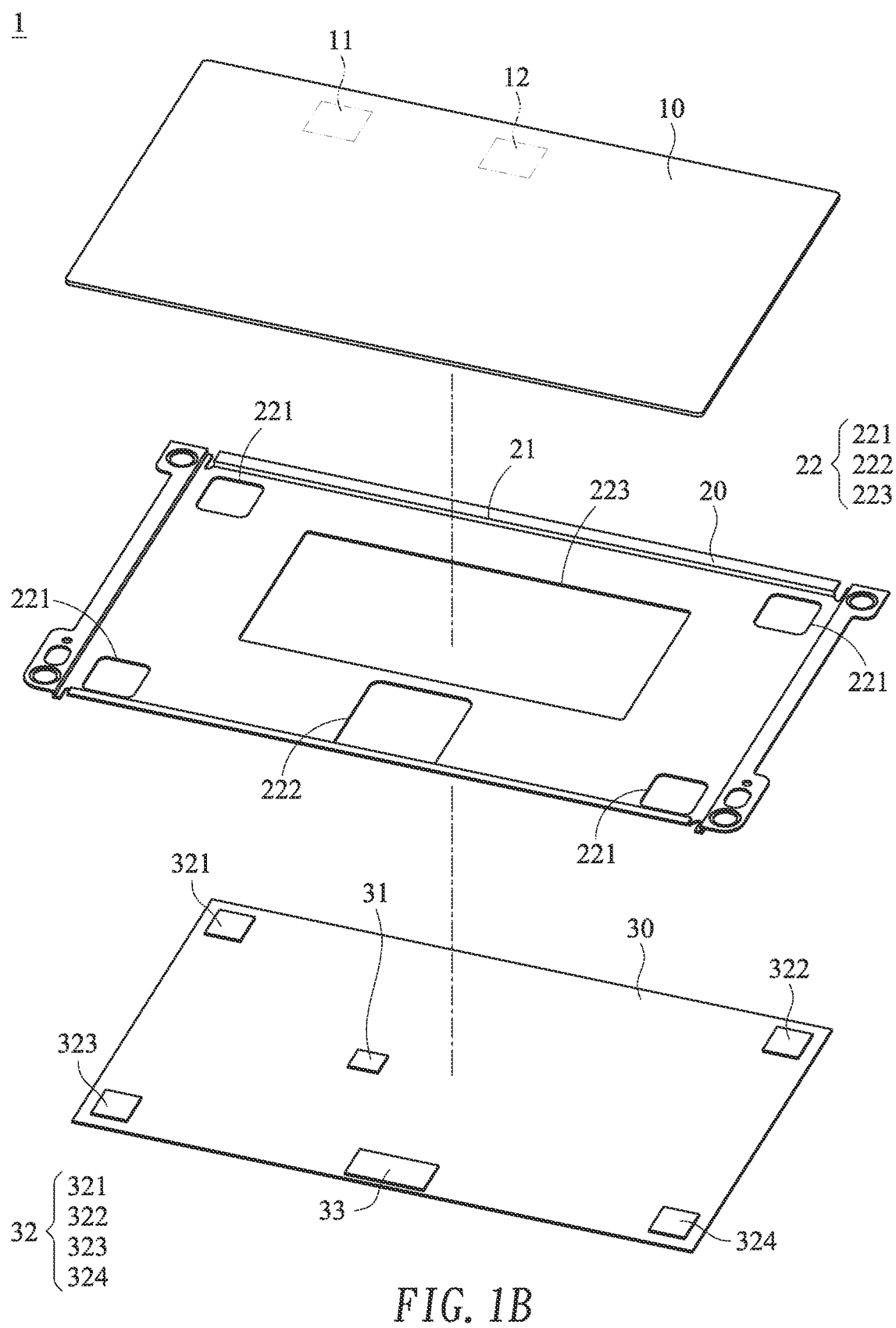
FIG. 1B is a schematic exploded view illustrating the touch device according to the embodiment of the present invention.

Please refer to FIGS. 1A and 1B. FIG. 1A is a schematic perspective view illustrating a touch device according to an embodiment of the present invention and taken along a viewpoint. FIG. 1B is a schematic exploded view illustrating the touch device according to the embodiment of the present invention. From top to bottom, the touch device 1 comprises a touch panel 10, a fixing frame 20 and a circuit board 30 sequentially.

The circuit board 30 is located under the touch panel 10. Moreover, the circuit board 30 is electrically connected with the touch panel 10. In an embodiment, the circuit board 30 comprises a storage unit 31, a pressure detector 32 and a vibrator 33. Preferably but not exclusively, the storage unit 31 is a flash memory, an electrically-erasable programmable read-only memory (EEPROM) or a programmable read-only memory (PROM). The pressure detector 32 comprises plural pressure detection units 321, 322, 323 and 324. Every two of the plural pressure detection units 321, 322, 323 and 324 are opposed to each other. In this embodiment, the positions of the plural pressure detection units 321, 322, 323 and 324 on the circuit board 30 are respectively aligned with four corners of the touch panel 10.

In some other possible embodiments, every two of the plural pressure detection units 321, 322, 323 and 324 are opposed to each other, and the positions of the plural pressure detection units 321, 322, 323 and 324 are aligned with two opposite sides of the touch panel 10.

In the above embodiment, the pressure detector 32 comprises the four pressure detection units 321, 322, 323 and 324. It is noted that the number of the pressure detection units and the positions of the pressure detection units are not restricted. That is, the number of the pressure detection units and the positions of the pressure detection units may be adjusted according to the size of the touch panel 10 or according to the practical requirements. Preferably, the plural pressure detection units are evenly or uniformly distributed.

The fixing frame 20 comprises a concave structure 21 and a hollow part 22. The hollow part 22 is formed in a bottom surface of the concave structure 21. Moreover, the hollow part 22 is aligned with the circuit board 30. The touch panel 10 is accommodated within the concave structure 21.

In an embodiment, the hollow part 22 comprises plural first openings 221, a second opening 222 and a third opening 223. The plural first openings 221 are respectively aligned with the pressure detection units 321, 322, 323 and 324 of the pressure detector 32. The pressure detection units 321, 322, 323 and 324 are exposed through the corresponding first openings 221 and contacted with a bottom surface of the touch panel 10. Moreover, since the pressure detection units 321, 322, 323 and 324 are symmetrically installed on the positions corresponding to four corners of the touch panel 10, the pressure detector 32 can accurately and instantly detect the magnitude of the force when the touch panel 10 is pressed.

The second opening 222 is aligned with the vibrator 33. The vibrator 33 is exposed through the second opening 222 and contacted with the bottom surface of the touch panel 10. Consequently, when a driving voltage is provided to the vibrator 33, the vibrator 33 is subjected to vibrate, and the touch panel 10 is correspondingly vibrated. The third opening 223 is aligned with the storage unit 31 and some electronic components (not shown) installed on the circuit board 30. Moreover, the wiring part (not shown) of the circuit board 30 can be electrically connected with the touch panel 10 through the third opening 223.

When the touch panel 10 is slid, touched or pressed by the user's finger, the detected coordinate value information is transmitted from the touch panel 10 to the circuit board 30. Then, the coordinate value information is transformed into an input signal by the circuit board 30. In this embodiment, the touch panel 10 comprises a first press region 11 and a second press region 12. The first press region 11 and the second press region 12 can be used as virtual keys, e.g., shortcut keys or numeric keys. In some possible embodiments, a backlight source is located below the first press region 11 and the second press region 12. When the first press region 11 and the second press region 12 are used as virtual keys, the backlight source projects light beams to the first press region 11 and the second press region 12. Consequently, recognizable optical marks are shown on the first press region 11 and the second press region 12 for allowing the user to quickly recognize the positions of first press region 11 and the second press region 12 and performing associated operations.

When the touch panel 10 is touched or pressed by the user's finger, the circuit board 30 judges whether the first press region 11 or the second press region 12 is touched or pressed according to the resolution of the touch panel 10 and the detected coordinate value information. In the above embodiment, the touch panel 10 comprises two press regions. It is noted that the number of the press regions, the arrangement of the press regions and the positions of the press regions in different touch devices may be defined according to the default setting values. In some possible embodiments, the press regions may be self-defined by the user according to the requirements or preferences of the user. That is, the example of defining the press regions is not restricted.

Figure 2:
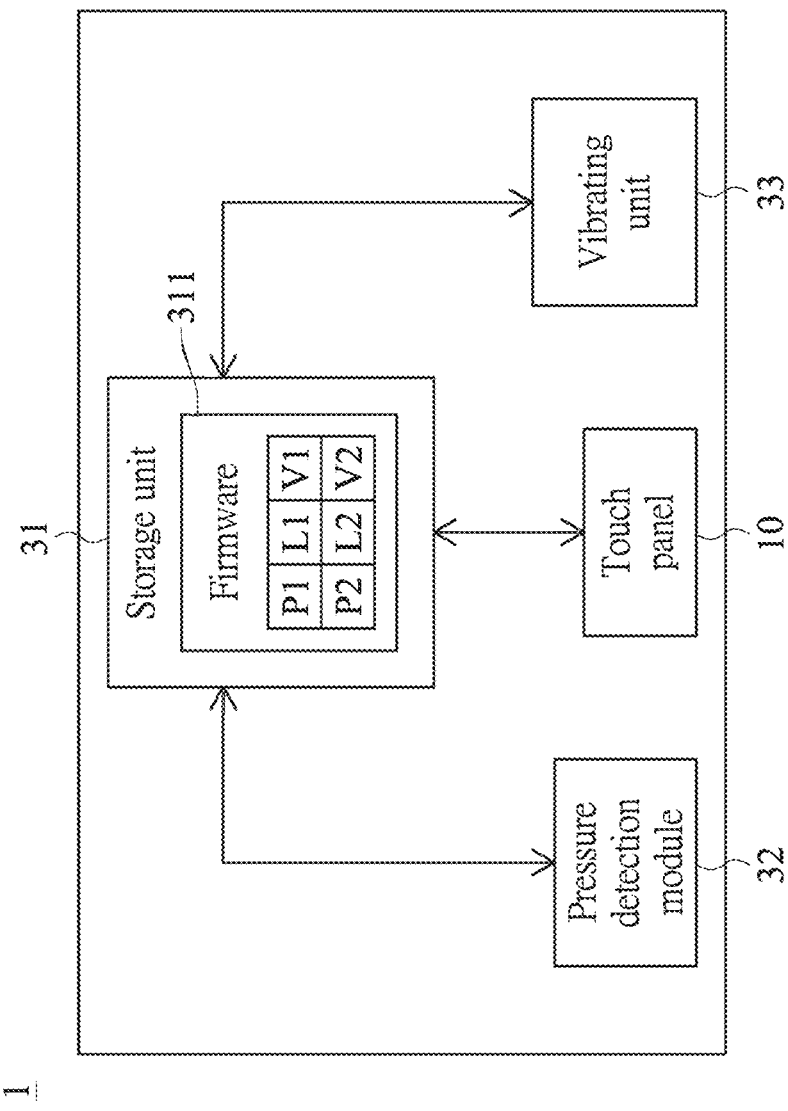
FIG. 2 is a schematic system block diagram illustrating the touch device according to the embodiment of the present invention.

FIG. 2 is a schematic system block diagram illustrating the touch device according to the embodiment of the present invention. As shown in FIG. 2, the storage unit 31 is electrically connected with the touch panel 10, the pressure detector 32 and the vibrator 33. The storage unit 31 comprises a firmware 311. Moreover, the firmware 311 contains the range coordinate values, the press trigger threshold values and the driving voltage values corresponding to the press regions 11 and 12 as shown in FIG. 1B. That is, the firmware 311 contains a first range coordinate value P1, a first press trigger threshold value L1 and a first driving voltage value V1 corresponding to the first press region 11 and a second range coordinate value P2, a second press trigger threshold value L2 and a second driving voltage value V2 corresponding to the second press region 12. The first press trigger threshold value L1 and the second press trigger threshold value L2 are not equal. The first driving voltage value V1 and the second driving voltage value V2 are not equal. In case that the press regions are self-defined by the user, the user can set and self-define the range coordinate values, the press trigger threshold values and the driving voltage values corresponding to different press regions through a software on a computing device that is connected with the touch device 1.

After the detected coordinate value information is transmitted from the touch panel 10 to the storage unit 31, the firmware 311 judges whether the coordinate value information complies with the first range coordinate value P1 or the second range coordinate value P2. Moreover, the magnitude of the force pressed on the touch panel 10 is transmitted from the pressure detector 32 to the storage unit 31.

Moreover, if the coordinate value information transmitted from the touch panel 10 complies with at least one of the first range coordinate value P1 and the second range coordinate value P2, the firmware 311 further judges whether the magnitude of the force pressed on the touch panel 10 reaches the first press trigger threshold value L1 (corresponding to the first press region 11) or the second press trigger threshold value L2 (corresponding to the second press region 12). If the judging condition is satisfied, the execution of the firmware 311 drives the vibrator 33 to result in vibration according to the first driving voltage value V1 or the second driving voltage value V2. Since the first driving voltage value V1 and the second driving voltage value V2 are not equal, the feedback vibration values on different press regions are different.

Figure 3:
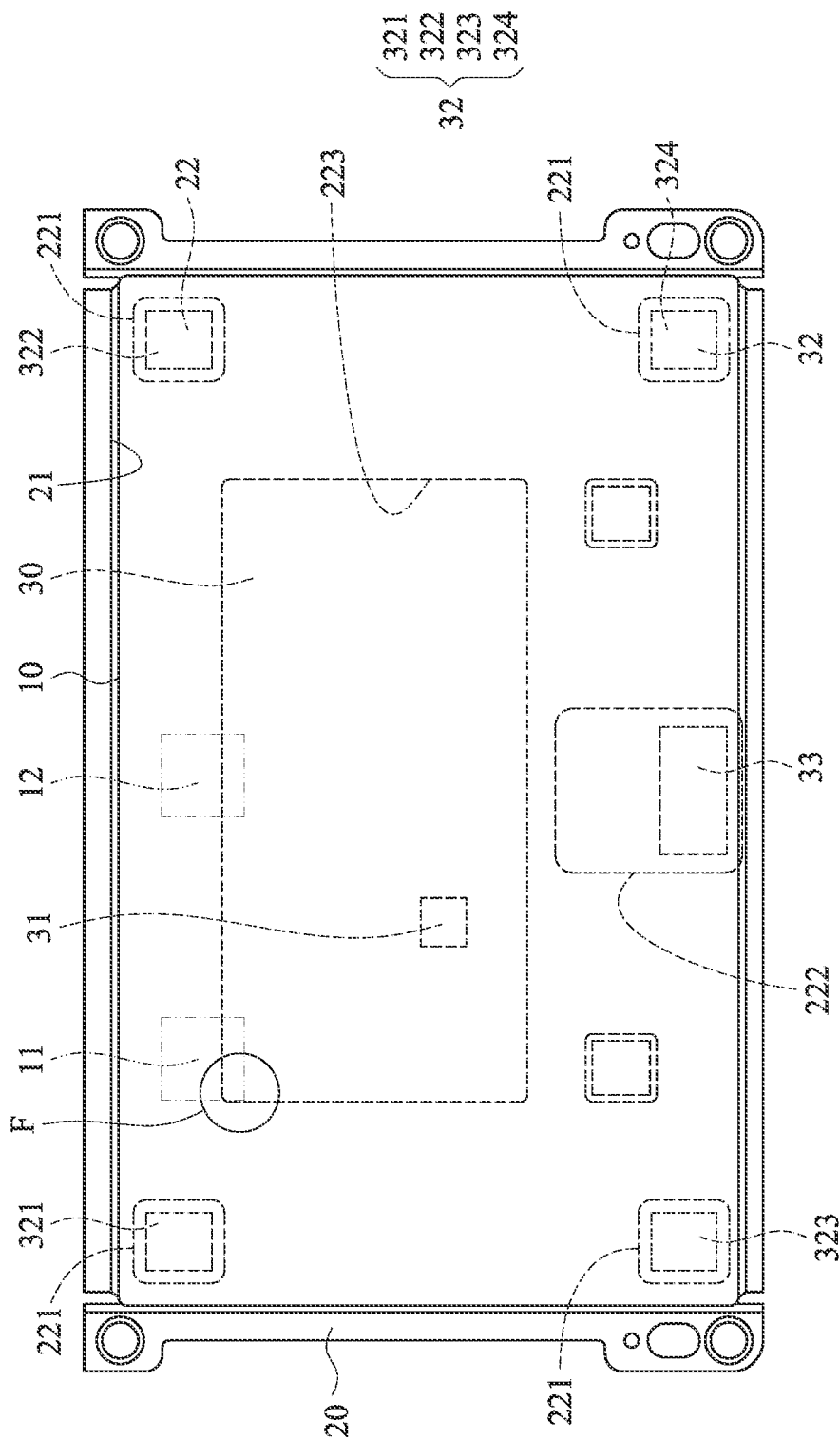
FIG. 3 is a schematic top view illustrating the touch device according to the embodiment of the present invention.

Please refer to FIGS. 2 and 3. FIG. 3 is a schematic top view illustrating the touch device according to the embodiment of the present invention. If the entire or a portion of the first press region 11 of the touch panel 10 is pressed in response to an external force F, the firmware 311 judges that the coordinate value information from the touch panel 10 is within the first range coordinate value P1. Then, the firmware 311 judges that the magnitude of the external force F detected by the pressure detector 32 reaches the first press trigger threshold value L1. Consequently, the execution of the firmware 311 drives the vibrator 33 to result in vibration according to the first driving voltage value V1. Under this circumstance, the first press region 11 has a first vibration feedback value. Similarly, if the entire or a portion of the second press region 12 of the touch panel 10 is pressed in response to the external force F, the firmware 311 judges that the coordinate value information from the touch panel 10 is within the second range coordinate value P2. Then, the firmware 311 judges that the magnitude of the external force F detected by the pressure detector 32 reaches the second press trigger threshold value L2. Consequently, the execution of the firmware 311 drives the vibrator 33 to result in vibration according to the second driving voltage value V2. Under this circumstance, the second press region 12 has a second vibration feedback value.

On the other hand, if the first press region 11 and the second press region 12 are simultaneously pressed in response to the external force F, the firmware 311 performs the associated judgement according to the first press trigger threshold value L1 and the second press trigger threshold value L2. For example, if the second press trigger threshold value L2 is lower than the first press trigger threshold value L1, the magnitude of the external force F reaches the second press trigger threshold value L2 at first. Consequently, the execution of the firmware 311 drives the vibrator 33 to result in vibration according to the second driving voltage value V2. Whereas, if the first press trigger threshold value L1 is lower than the second press trigger threshold value L2, the magnitude of the external force F reaches the first press trigger threshold value L1 at first. Consequently, the execution of the firmware 311 drives the vibrator 33 to result in vibration according to the first driving voltage value V1.

From the above descriptions, the present invention provides the touch device. The touch device comprises at least two press regions. When the magnitudes of the forces pressed on different regions of the touch panel are different, the vibration feedback values generated by the press regions are different. Due to this design, the user can achieve a good pressing experience. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch device, comprising:
a touch panel comprising at least two press regions; and
a circuit board located under the touch panel and electrically connected with the touch panel, wherein the circuit board comprises:
a storage unit comprising a firmware, wherein the firmware contains at least two range coordinate values, at least two press trigger threshold values and at least two driving voltage values corresponding to the at least two press regions;
a vibrator that vibrates the touch panel; and
a pressure detector that detects a magnitude of an external force pressed on the touch panel, wherein when the external force is applied to a selected press region of the at least two press regions, the magnitude of the external force is detected by the pressure detector,
wherein when a coordinate value of the selected press region is within a range coordinate value of the at least two range coordinate values corresponding to the selected press region and the magnitude of the external force reaches a press trigger threshold value of the at least two press trigger threshold values corresponding to the selected press region, the firmware is executed to drive the vibrator to result in vibration according to a corresponding driving voltage value of the at least two driving voltage values, so that the selected press region has a corresponding feedback vibration value.

2. The touch device according to claim 1, wherein the firmware contains a first range coordinate value, a first press trigger threshold value and a first driving voltage value corresponding to a first press region of the at least two press regions and a second range coordinate value, a second press trigger threshold value and a second driving voltage value corresponding to a second press region of the at least two press regions.

3. The touch device according to claim 2, wherein the first press trigger threshold value and the second press trigger threshold value are not equal.

4. The touch device according to claim 2, wherein the first driving voltage value and the second driving voltage value are not equal.

5. The touch device according to claim 1, wherein the pressure detector comprises four pressure detection units.

6. The touch device according to claim 5, wherein every two of the four pressure detection units are opposed to each other.

7. The touch device according to claim 6, wherein the four pressure detection units are respectively aligned with four corners of the touch panel, or the four pressure detection units are aligned with two opposite sides of the touch panel.

8. The touch device according to claim 1, wherein the touch device further comprises a fixing frame, and the fixing frame comprises a concave structure, wherein the touch panel is accommodated within the concave structure, the circuit board is located under the fixing frame, and the circuit board and the touch panel are opposed to each other with respect to the fixing frame.

9. The touch device according to claim 8, wherein the fixing frame further comprises a hollow part, wherein the hollow part is formed in a bottom surface of the concave structure, and the hollow part is aligned with the circuit board.

10. The touch device according to claim 9, wherein the hollow part comprises at least one first opening corresponding to the pressure detector, wherein the pressure detector is exposed through the at least one first opening and contacted with a bottom surface of the touch panel.

11. The touch device according to claim 9, wherein the hollow part comprises a second opening corresponding to the vibrator, wherein the vibrator is exposed through the second opening and contacted with a bottom surface of the touch panel.

12. The touch device according to claim 9, wherein the hollow part comprises a third opening, wherein the circuit board is electrically connected with the touch panel through the third opening.

13. The touch device according to claim 1, wherein the storage unit is a flash memory, an electrically-erasable programmable read-only memory (EEPROM) or a programmable read-only memory (PROM).

* * * * *